Patented Sept. 4, 1928.

1,683,068

UNITED STATES PATENT OFFICE.

THOMAS W. W. FORREST, OF FRESNO, CALIFORNIA, ASSIGNOR TO SUNLAND SALES COOPERATIVE ASSOCIATION, OF FRESNO, CALIFORNIA, A CORPORATION OF CALIFORNIA.

METHOD OF TREATING DRIED FIGS AND DRIED PRUNES.

No Drawing. Application filed December 27, 1926. Serial No. 157,416.

This invention relates to the processing of dried fruit for market, and particularly to a specific treatment of dried figs and dried prunes.

The object of the invention is to condition or recondition dried figs or dried prunes which either have become undesirable through sugaring of their exteriors or which are liable to so sugar, so as to remove the objectional appearance or prevent it from forming and at the same time imparting to the fruit a more even or equalized color, a glossy appearance, a more tender and better flavored meat; also such a treatment which may be applied to the boxed or packaged fruit which may have taken on the appearance mentioned so as to become unsalable.

This sugaring referred to is the formation of whitish deposits more or less amorphous or crystalline on the surface of the fruit, particularly after storage, and which is particularly objectionable with dried figs and prunes, probably on account of their similar tough skins holding the substance more on the outside, and also the natural darkness of the skins contrasting therewith so as to render it more visible.

This condition described is usually also attendant upon an unsatisfactory condition of the meat of the fruit, usually uneven in texture probably due to a rather low or uneven distribution of its moisture content.

Briefly described my treatment comprises determining the moisture content of the fruit and then applying heat at a relatively low temperature to it for a relatively long time so as to gradually force the moisture within the fruit to even distribution and to redissolve as it were the sugary coating for reabsorption into the fruit, while at the same time the natural sugars are slightly caramelized throughout the fruit body so that the same becomes of even unctuous texture, tender, of an improved flavor, and of an improved substantially permanent glossy external appearance.

In practice, the moisture content of the fruit should range between 14 and 26 per centum by weight, the amount of heat and length of treatment varies with this moisture content of the fruit, but is always kept below a temperature of 212° F. and ranges in duration from 15 minutes to 6 hours.

In carrying out the process with very dry fruit it is first washed in water or with steam and dried to the proper moisture content preferably between 15 and 18 per cent for figs, and from 19 to 21 for prunes, or the fruit is steamed to bring the moisture content to within these figures, then placed in a preferably closed oven and the heat gradually applied, keeping it below 212 degrees F. so as not to boil the fruit within or evaporate the moisture from without, and the temperature is maintained for an hour or two if necessary until an examination of the fruit shows it to be in the desired condition with slight caramelization of its natural sugars and which takes place at and below 200 degrees F.

Where fruit such as dried figs has been packed in transparent cellulose tissue or otherwise and has assumed the undesirable condition mentioned, the packages in unopened condition, or boxes of the packages are introduced into the oven and a very moderate temperature say from 150 to 180 degrees F. maintained for a period of time extending sometimes to six hours, and which will gradually penetrate the packages and layers of figs within the packages until the moisture of the figs is made to penetrate every particle thereof, is drawn outward to the surface of the skins, and dissolves the objectional coatings so that they are reabsorbed into the softened and opened pores of the skins, and partially caramelizes the fruit sugars so that the meat is kept soft and tender. And most important is the fact that this takes place within the packages of figs without causing them to stick to the package or causing any exudation of sticky juices which might soil the package to make it unsalable.

The process above described particularly with figs has been found equally satisfactory in the treatment of dried prunes, and in either case it should be noted that it comprises a combination or relatively low moisture content and long heat duration below boiling temperature yet sufficient to slightly caramelize the fruit sugars—all of which permits of its application to already packaged goods and hence it effects a process easily distinguishable from the common methods of heat treatment of fruit merely for sterilization purposes.

I claim:

1. The method of reconditioning packaged dried fruits such as dried figs and dried prunes in which the fruit has become surface sugared through storage conditions, which comprises placing the unopened packages of fruit in a receptacle and applying a heat thereto to maintain a temperature throughout the fruit below 212 degrees F. until the sugary coating has been dissolved and reabsorbed.

2. The method of reconditioning packaged dried fruits such as dried figs and dried prunes in which the fruit has become surface sugared through storage conditions, which comprises placing the unopened packages of fruit in a receptacle and applying a heat thereto to maintain a temperature throughout the fruit below 212 degrees F. until the sugary coating has been dissolved and slight caramelization of the fruit has taken place.

THOMAS W. W. FORREST.